US011066161B2

(12) United States Patent
Mermoz et al.

(10) Patent No.: US 11,066,161 B2
(45) Date of Patent: Jul. 20, 2021

(54) ELECTRICALLY OR HYBRID POWERED MULTIROTOR AIRCRAFT WITH OPTIMIZED ENERGY CONSUMPTION

(71) Applicant: AIRBUS HELICOPTERS, Marignane (FR)

(72) Inventors: Emmanuel Mermoz, Peynier (FR); Frederic Balayn, Vitrolles (FR); Xavier Maraninchi, Les Pennes Mirabeau (FR)

(73) Assignee: Airbus Helicopters, Marignane (FR)

( * ) Notice: Subject to any disclaimer, the term of this patent is extended or adjusted under 35 U.S.C. 154(b) by 70 days.

(21) Appl. No.: 16/581,982

(22) Filed: Sep. 25, 2019

(65) Prior Publication Data

US 2020/0115045 A1 Apr. 16, 2020

(30) Foreign Application Priority Data

Sep. 28, 2018 (FR) .................................... 1801009

(51) Int. Cl.
*B64C 29/00* (2006.01)
*B64D 27/24* (2006.01)
(Continued)

(52) U.S. Cl.
CPC .......... *B64C 29/0033* (2013.01); *B64D 27/24* (2013.01); *B64C 27/08* (2013.01);
(Continued)

(58) Field of Classification Search
CPC ........ B64D 31/10; B64D 27/24; B64D 27/26; B64C 27/52; B64C 27/26; B64C 27/08;
(Continued)

(56) References Cited

U.S. PATENT DOCUMENTS 2,462,715 A 2/1949 Booth
3,037,721 A * 6/1962 Stefanutti ........... B64C 29/0033
244/7 R
(Continued)

FOREIGN PATENT DOCUMENTS

CN 205221105 U 5/2016
CN 205440869 U 8/2016
(Continued)

OTHER PUBLICATIONS

French Search Report for French Application No. FR 1800986, Completed by the French Patent Office, dated Jul. 3, 2019, 11 pages.
(Continued)

*Primary Examiner* — Benjamin P Lee
(74) *Attorney, Agent, or Firm* — Brooks Kushman P.C.

(57) ABSTRACT

An electrically or hybrid powered multirotor aircraft with complete redundancy on all of its functions of lift, of propulsion, and of control, the aircraft having optimized energy consumption and comprising: a longitudinal structure having two longitudinal beams; a fuselage fastened to the longitudinal structure; two fixed wings serving essentially to provide the aircraft with lift in cruising flight and arranged at respective ends of the longitudinal structure and in a common first plane; at least six rotors serving essentially to provide the aircraft with lift during stages of takeoff and landing, the rotors being arranged in a common second plane distinct from the first plane and parallel to the first plane in such a manner as not to be situated vertically above or below a fixed wing; and two propulsion propellers. An electrical or hybrid power plant serves to drive the rotors and the propulsion propellers in rotation.

20 Claims, 5 Drawing Sheets

(51) Int. Cl.
*B64C 27/08* (2006.01)
*B64C 27/26* (2006.01)

(52) U.S. Cl.
CPC .......... *B64C 27/26* (2013.01); *B64C 29/0025* (2013.01); *B64C 2201/042* (2013.01); *B64C 2201/104* (2013.01); *B64C 2201/108* (2013.01)

(58) Field of Classification Search
CPC ... B64C 29/02; B64C 29/0033; B64C 39/024; B64C 2201/021; B64C 2201/024; B64C 2201/042; B64C 2201/108; B64C 2201/165; B64C 2201/04; G05D 1/0072; G05D 1/0077; G05D 1/101; G05D 3/00; Y02T 50/62
See application file for complete search history.

(56) References Cited

U.S. PATENT DOCUMENTS

| | | | |
|---|---|---|---|
| 3,089,666 | A | 5/1963 | Quenzler |
| 3,869,391 | A | 3/1975 | Kramer |
| 4,323,843 | A | 4/1982 | Batham |
| 4,731,578 | A | 3/1988 | Tsaprazis |
| 4,831,362 | A | 5/1989 | Tsaprazis |
| 5,027,065 | A | 6/1991 | Bares et al. |
| 5,264,832 | A | 11/1993 | Parmer |
| 5,384,535 | A | 1/1995 | Mayeur |
| 5,634,755 | A | 6/1997 | Jones, Jr. |
| 5,839,691 | A * | 11/1998 | Lariviere ............ B64C 27/605 244/7 R |
| 5,890,441 | A * | 4/1999 | Swinson ............ B64C 29/0025 244/12.1 |
| 10,053,213 | B1 * | 8/2018 | Tu ..................... B64C 39/024 |
| 10,081,436 | B1 | 9/2018 | Tian |
| 10,472,064 | B2 * | 11/2019 | Tian ................... B64C 39/024 |
| 10,501,173 | B1 * | 12/2019 | Douglas ............. B64D 27/24 |
| 10,501,193 | B2 * | 12/2019 | Oldroyd ............. B64D 27/26 |
| 10,518,875 | B2 * | 12/2019 | Judas ................. B64C 29/0025 |
| 10,526,083 | B2 * | 1/2020 | Shaw ................. B64C 27/28 |
| 10,577,091 | B2 * | 3/2020 | Parks ................. B64C 39/08 |
| 10,633,092 | B2 * | 4/2020 | Willford ............. G05D 1/0055 |
| 2009/0084890 | A1 * | 4/2009 | Reinhardt ........... B64C 29/0033 244/12.4 |
| 2012/0012692 | A1 | 1/2012 | Kroo |
| 2014/0097290 | A1 * | 4/2014 | Leng .................. B64D 17/00 244/6 |
| 2015/0177116 | A1 | 6/2015 | Kudrna |
| 2016/0207625 | A1 * | 7/2016 | Judas ................. B64C 29/0025 |
| 2016/0236774 | A1 | 8/2016 | Niedzballa |
| 2016/0347447 | A1 * | 12/2016 | Judas ................. B64C 39/024 |
| 2017/0106978 | A1 * | 4/2017 | Sopper ............... B65D 5/4208 |
| 2017/0240273 | A1 * | 8/2017 | Yuen ................. B64C 29/0033 |
| 2018/0155021 | A1 * | 6/2018 | Patterson ........... B64C 29/0033 |
| 2018/0334251 | A1 * | 11/2018 | Karem ............... B64C 29/0033 |
| 2019/0127056 | A1 * | 5/2019 | Weekes .............. B64C 27/08 |
| 2019/0197643 | A1 * | 6/2019 | Cochran ............. G06Q 50/28 |
| 2019/0241260 | A1 * | 8/2019 | Alhussan ........... B64D 35/04 |
| 2020/0290742 | A1 * | 9/2020 | Kumar ............... B64D 27/02 |
| 2020/0407055 | A1 * | 12/2020 | Mores ................. B64C 39/068 |

FOREIGN PATENT DOCUMENTS

| | | |
|---|---|---|
| CN | 206231620 U | 6/2017 |
| CN | 206417197 U | 8/2017 |
| EP | 0116468 A1 | 8/1984 |
| EP | 0398800 A1 | 11/1990 |
| EP | 0576306 A1 | 12/1993 |
| EP | 3056425 A1 | 8/2016 |
| EP | 3279650 A1 | 2/2018 |
| FR | 2443691 A1 | 7/1980 |
| FR | 2564897 A1 | 11/1985 |
| FR | 2581455 A1 | 11/1986 |
| FR | 2598818 A1 | 11/1987 |
| GB | 590173 A | 7/1947 |
| GB | 2029580 A | 3/1980 |
| WO | 2012012474 A2 | 1/2012 |
| WO | 2013013084 A1 | 1/2013 |
| WO | 2017157855 A1 | 9/2017 |
| WO | 2017200609 A1 | 11/2017 |
| WO | 2018075414 A1 | 4/2018 |
| WO | 2018103458 A1 | 6/2018 |

OTHER PUBLICATIONS

French Search Report for French Application No. FR 1801009, Completed by the French Patent Office, dated Aug. 9, 2019, 12 pages.

* cited by examiner

ELECTRICALLY OR HYBRID POWERED MULTIROTOR AIRCRAFT WITH OPTIMIZED ENERGY CONSUMPTION

CROSS-REFERENCE TO RELATED APPLICATIONS

This application claims priority to French patent application No. FR 18 01009 filed on Sep. 28, 2018, the disclosure of which is incorporated in its entirety by reference herein.

BACKGROUND OF THE INVENTION

(1) Field of the Invention

The present invention relates to the field of multirotor aircraft, and in particular to multirotor aircraft dedicated to transporting people or goods.

(2) Description of Related Art

The present invention relates to an electrically or hybrid powered multirotor aircraft with full redundancy concerning its functions of lift, of propulsion, and of control, and with optimized energy consumption.

The term "multirotor aircraft" is used below for convenience to designate an aircraft having at least two rotors constituting respective rotary wings. For example, at present, a multirotor aircraft in conventional use may have three, four, six, or eight rotors. On occasion, a multirotor aircraft may perform takeoff and landing that are substantially vertical. For this purpose, one or more rotors of the multirotor aircraft are arranged in such a manner that their rotor disks are substantially horizontal, i.e. in such a manner that these rotors have axes of rotation that are substantially vertical, so as to constitute respective rotary wings. A multirotor aircraft is also referred to by the term "drone" when it has no on-board pilot, nor any on-board passenger.

Numerous multirotor aircraft architectures have been studied, giving rise both to mere demonstrators, and also to production, for architectures that have been found to be the most advantageous. New architectures are continuing to be explored at the present time. The dimensions of such multirotor aircraft may lie in the range a few centimeters to several tens of meters, both in length, i.e. longitudinally, and in span, i.e. transversely.

In the context of the invention, a multirotor aircraft is used mainly for air transport missions that are of a commercial or para-public nature and in zones that are environmentally sensitive, such as cities or indeed national parks, for example, and over distances that are limited, typically in the range 50 kilometers (km) to 100 km. Such air transport is thus of short duration, e.g. of the order of a few tens of minutes to one hour, and it serves the transport one or more passengers and/or goods. Furthermore, being located in sensitive zones imposes severe environmental and safety constraints.

Those various architectures may combine the use both of rotors that are dedicated to providing the aircraft with lift, i.e. having axes of rotation that are substantially vertical and forming rotary wings, and also of rotors dedicated to propelling the aircraft, i.e. having axes of rotation that are substantially horizontal and forming propulsion propellers, or alternatively the same rotors may be used for providing the aircraft both with lift and with propulsion. These various architectures may also combine the use of fixed wings and of rotary wings.

Compared with aircraft architectures in which lift in forward flight is provided by one or more fixed wings, aircraft architectures in which lift is provided solely by rotors consume more energy while flying in translation, and consequently their range is limited. Furthermore, while flying in translation, the attitude in flight of such aircraft where lift is provided solely by rotors remains uncertain, and can lead to poor comfort in flight.

By way of example, Document U.S. Pat. No. 3,089,666 describes an aircraft having one or more fixed wings and a plurality of rotors that tilt about a transverse horizontal axis. As a result, the rotors supply only substantially vertical aerodynamic lift forces during stages of takeoff and landing, and only substantially horizontal aerodynamic propulsion forces during stages of cruising.

Document WO 2017/200609 describes an aircraft having two wings and a plurality of rotors carried by each of those wings. The wings carrying the rotors tilt about a transverse horizontal axis so that the rotors generate either lift or else a propulsion force, depending on the position of the wings.

Nevertheless, in both of those architectures, it can be complicated to manage the transition stage between horizontal flight and vertical flight. Furthermore, tilting the rotors, or indeed each wing, involves a mechanical system that is likewise complicated and may be of significant weight. Finally, a failure of such a mechanical tilting system can make piloting the aircraft very difficult, or even dangerous.

Also known are Documents WO 2018/075414, WO 2013/013084, U.S. Pat. No. 10,081,436, WO 2012/012474, US 2012/0012692, and US 2016/0207625 which describe multirotor aircraft having one or more fixed wings and a plurality of rotors, with rotor disks that are substantially horizontal and suitable for generating vertical lift, together with one or more rotors with rotor disks that are substantially vertical, forming respective propellers for horizontal propulsion.

Document US 2016/0207625 describes in particular a multirotor aircraft having two fixed wings of substantially identical dimensions, four rotors positioned at respective free ends of each of the wings, and one or more propulsion propellers. Document WO 2018/075414 describes specifically a multirotor aircraft having twelve rotors mounted in front of or behind a wing, each rotor being capable of being tilted about a longitudinal horizontal axis. Nevertheless, the proximity of the rotors with a wing can lead to the appearance of a downwardly directed aerodynamic force, referred to as "negative lift", that opposes the provision of lift for the aircraft. Under such circumstances, the energy consumption of the aircraft is increased in order to compensate for this negative lift, with the consequence of limiting the range of the aircraft.

Document U.S. Pat. No. 10,081,436 describes a drone having wings in a canard type configuration with a central body, a main wing and a front wing being arranged in a common plane, the front wing being smaller than the main wing. Two longitudinal supports connect the front wing to the main wing on either side of the central body. A plurality of rotors are arranged on the longitudinal supports, above or below the plane formed by the wings. A propulsion propeller is arranged at the rear of the central body.

Documents WO 2013/013084, WO 2012/012474, and US 2012/0012692 describe a multirotor aircraft having two wings of different dimensions that are arranged in two distinct parallel planes, eight rotors, and two propulsion propellers positioned behind the rear wing. The eight rotors form two series of four rotors in longitudinal alignment.

These two series of rotors are positioned between the two wings and substantially in the same plane as the rear wing. The multirotor aircraft may include ducts for each series of rotors in order to limit the appearance of aerodynamic drag. Nevertheless the air stream sweeping over the rear wing, which is the larger wing and provides the major part of lift during cruising flight, is disturbed after sweeping over the rotors situated upstream from the rear wing. Consequently, the efficiency of the rear wing is reduced, thereby contributing to increasing the energy consumption of the aircraft and consequently to reducing its range.

Finally, the technological background of the invention also includes the following documents EP 3 056 425, WO 2018/103458, CN 205 440 869, CN 206 417 197, CN 205 221 105, and CN 206 231 620.

Also, whatever the architecture of a multirotor aircraft, each rotor may be driven directly by an electric motor or else by a combustion engine or indeed by a mechanical transmission, itself driven by one or more combustion engines. When each rotor is driven by a respective electric motor, the aircraft may have a single source of electrical energy, e.g. comprising one or more electrical energy storage devices, such as an optionally rechargeable battery, or indeed a fuel cell. The aircraft may also have a second source of electrical energy comprising an electricity generator driven by a combustion engine. As a result, the multirotor aircraft may be powered electrically only, or it may be hybrid powered, i.e. both electrically and by burning fuel.

Furthermore, depending on the architecture of such a multirotor aircraft, the consequences of a failure of a rotor, or indeed of a motor, can be significant, both in terms of the mechanical strength and the equilibrium of the aircraft, and also in terms of the ability of the aircraft to fly safely. Specifically, the failure of a rotor leads to an imbalance in the lift and/or propulsion forces generated by the set of rotors of the aircraft, which can cause mechanical stresses to be generated in the structure of the aircraft, in particular stresses in bending and/or in twisting.

Furthermore, such a failure of a rotor leads to a loss of lift and/or of propulsion force that, if not compensated by the other rotors, can endanger the flying safety of the aircraft by making it difficult to control, and consequently making landing the aircraft complicated and dangerous.

BRIEF SUMMARY OF THE INVENTION

The present invention seeks to provide an electrically or hybrid powered multirotor aircraft capable of avoiding the above-mentioned limitations, both by having optimized energy consumption and also by enabling the loss of lift from at least one of the rotors to be mitigated without endangering the flying safety of the aircraft, and without endangering its structural integrity.

The present invention provides an electrical or hybrid powered multirotor aircraft, the aircraft comprising:
 a longitudinal structure having two longitudinal ends;
 a fuselage fastened to the longitudinal structure;
 a set of fixed lift surfaces having two fixed wings generating the majority of the aerodynamic lift force needed by the aircraft during a cruising stage of flight, the two fixed wings being connected to respective ends of the longitudinal structure;
 a set of rotary lift surfaces having at least six rotors generating the majority of the aerodynamic lift force needed by the aircraft during stages of takeoff and landing, the rotors being arranged on respective supports fastened to a fixed wing, each rotor being fastened in such a manner that each rotor is not situated vertically above or below a fixed wing;
 a propulsion assembly comprising at least one propulsion propeller;
 a power plant comprising a plurality of electric motors and at least one electrical energy source:
  each electric motor driving a respective rotor or else a respective propulsion propeller; and
  at least one electrical energy source comprising one or more electrical energy storage devices; and
 an autopilot system for the aircraft.

The term "longitudinal structure" designates a structure that extends essentially parallel to a longitudinal direction X of the aircraft. Such a longitudinal direction X extends from the rear of the aircraft towards the front of the aircraft. Furthermore, an elevation direction Z of the aircraft extends downwards perpendicularly to the longitudinal direction X. Finally, a transverse direction Y extends from left to right perpendicularly to the longitudinal and elevation directions X and Z.

The term "longitudinal" thus relates to any direction parallel to the longitudinal direction X. Likewise, the term "transverse" relates to any direction parallel to the transverse direction Y, and the term "in elevation" or the term "vertical" relates to any direction parallel to the elevation direction Z.

Furthermore, the longitudinal direction X is the roll axis of the aircraft, the transverse direction Y is its pitching axis, and the elevation direction Z is its yaw axis.

The multirotor aircraft of the invention is remarkable in that the two fixed wings are rigidly fastened to respective ones of the longitudinal ends of the longitudinal structure, the longitudinal structure extends mainly in a first plane P1, and the rotors are arranged in a common second plane P2 distinct from the first plane P1. Preferably, the second plane P2 is substantially parallel to the first plane P1.

The first plane P1 is thus attached to the longitudinal structure and is preferably parallel to the longitudinal direction X and to the transverse direction Y.

The second plane P2 is formed by the points where the respective axes of rotation of the rotors intersect a mean plane formed by their blades. The axes of rotation of the rotors are substantially parallel to the elevation direction Z.

A flight of the multirotor aircraft comprises a take off stage, a cruising stage, and a landing stage. The term "cruising stage" is used to mean the stage of flight constituted by cruising flight in a substantially horizontal direction and/or at successive horizontal levels, with a speed of advance that is substantially horizontal and longitudinal. By way of example, during the cruising stage, the speed of advance is greater than or equal to a predetermined speed of advance.

As from this predetermined speed of advance, the set of fixed lift surfaces advantageously generates most, or indeed all, of the lift needed by the aircraft. For example, the set of fixed lift surfaces may generate 80% to 100% of the lift needed by the aircraft during such a cruising stage.

While the aircraft is advancing with a speed of advance less than the predetermined speed of advance, the lift needed by the aircraft is generated both by the set of fixed lift surfaces and by the set of rotary lift surfaces.

However, during vertical flight, i.e. during stages of takeoff and landing, and also during flight at low speeds of advance, the set of fixed lift surfaces generate little lift. Under such circumstances, it is the set of rotary lift surfaces that generates most of the lift needed by the aircraft.

As a result, the multirotor aircraft of the invention advantageously presents redundancy concerning its lift functions.

The longitudinal structure may be provided with two longitudinal beams extending mainly in the first plane P1 and having at least one fixed wing fastened directly thereto. The two longitudinal beams are straight and arranged in coplanar manner. The first plane P1 is then formed more precisely by the center lines of these longitudinal beams. By way of example, the two longitudinal beams are made of metal, directly out of steel or aluminum alloy, or else they are made of composite material, such as carbon fiber.

Instead of the two above-mentioned longitudinal beams, the longitudinal structure may comprise a rigid box. The rigid box is mostly plane in shape and extends in the first plane P1, with at least one fixed wing being fastened directly to the rigid box. By way of example, the cross-section of the rigid box may be rectangular or elliptical. By way of example, the rigid box may be made as a single piece of composite material.

In a first embodiment of the multirotor aircraft of the invention, both fixed wings are fastened rigidly to the longitudinal structure and substantially in the first plane P1. As a result, both fixed wings are typically fastened so as to extend the two longitudinal beams, or else the rigid box, serving to form the longitudinal structure.

Both fixed wings are also preferably fastened directly to the longitudinal beams or else to the rigid box. As a result, a rigid central framework is formed by the longitudinal structure and by the two fixed wings. By way of example, this rigid central framework may thus be formed either by the two longitudinal beams and the two fixed wings, or else by the rigid box and the two fixed wings.

The two fixed wings are thus arranged substantially in the first plane P1 or else very close to this first plane P1, and as a result they are offset vertically relative to the rotors and to the second plane P2. Nevertheless, the two fixed wings may have different orientations in order to improve the aerodynamic behavior of the aircraft. The two fixed wings are then neither parallel to each other nor to the first plane P1.

In a second embodiment of the multirotor aircraft of the invention, one of the fixed wings is offset vertically, preferably downwards, relative to the other fixed wing and relative to the first plane P1. Both fixed wings are then offset vertically relative to the rotors so that neither of the fixed wings is arranged in the second plane P2.

Preferably, a front fixed wing, which is situated longitudinally at the front of the longitudinal structure of the multirotor aircraft of the invention, is offset vertically downwards relative both to a rear fixed wing, which is situated longitudinally at the rear of the longitudinal structure of the multirotor aircraft, and also relative to the first plane P1.

The longitudinal structure then has two connection beams that slope relative to the first plane P1, and this vertically-offset fixed wing is fastened to respective first ends of each of the connection beams. Together with the fixed wings and the remainder of the longitudinal structure, the two connection beams contribute to forming a rigid central framework.

For example, the two connection beams are rigidly fastened to the rigid box of the longitudinal structure at respective second ends of the connection beams. The second ends of the connection beams are remote from the fixed wing that is fastened to the connection beam. Together with the fixed wings, the two connection beams and the rigid box form the rigid central framework.

In another example, the two connection beams are rigidly fastened to respective ones of the two longitudinal beams of the longitudinal structure via respective second ends of each of the connection beams. Together with the fixed wings, the two connection beams and the two longitudinal beams form the rigid central framework.

Furthermore, under such circumstances, the longitudinal structure may also include a transverse beam rigidly fastened to the two longitudinal beams, e.g. at the second ends of the connection beams. The transverse beam connects together the two longitudinal beams and contributes to stiffening the rigid central framework.

By way of example, the two connection beams, and the transverse beam, if any, may be made of metal or else they may be made of composite materials.

Also, a longitudinal beam and a connection beam may be constituted by a single part. A sharp angle may be present at the junction between a longitudinal beam and a connection beam. Connection spokes may also serve to connect together a longitudinal beam and a connection beam.

Whatever the embodiment of the invention, the two fixed wings forming the set of fixed lift surfaces are positioned at the longitudinal ends of the longitudinal structure in order to limit the longitudinal size of the aircraft.

Furthermore, whatever the embodiment, the rotors forming the set of rotary lift surfaces are offset horizontally and vertically relative to the longitudinal structure and to the fixed wings. Firstly, having an offset between the rotors and the fixed wings in the horizontal plane, i.e. perpendicularly to the elevation direction Z, makes it possible for none of the rotors to be situated above a fixed wing, and therefore advantageously avoids giving rise to negative lift appearing on the fixed wings of the aircraft.

Thereafter, having an offset between the rotors and the fixed wings in the vertical plane, i.e. parallel to the elevation direction Z, advantageously makes it possible to optimize the generation of lift by each of the fixed wings. Specifically, the air stream sweeping over both of the fixed wings is situated in the first plane P1, with this applying in particular to the stream sweeping over the rear fixed wing, and it is disturbed little or not at all by the rotors that are situated upstream from the fixed wings in the second plane P2, which is distinct from the first plane P1, thereby enabling lift to be generated in optimum manner.

Furthermore, in the second embodiment of the multirotor aircraft of the invention, the vertical offset between the two fixed wings also improves the aerodynamic efficiency of each fixed wing, regardless of the angle of attack of the aircraft.

Also, during the cruising stage, the speed of rotation of the rotors may be reduced, or even stopped when the lift generated by the fixed wings is sufficient to enable the aircraft to fly. Consequently, the multirotor aircraft of the invention advantageously performs the cruising stage while optimizing energy consumption.

The presence of the rigid central framework provides the aircraft with mechanical strength and considerable stiffness, advantageously enabling all of the forces and moments coming from the fixed wings and the rotors to be taken up. Furthermore, in the event of lift being lost from at least one rotor providing the multirotor aircraft of the invention with lift, the aerodynamic lift forces generated by the rotors remaining in operation will be unbalanced and will lead to additional mechanical stresses on the multirotor aircraft, and in particular on its longitudinal structure. Advantageously, the presence of this rigid central framework serves to absorb these mechanical stresses and in particular the twisting that might appear.

In the event of losing lift from at least one rotor, the lift generated by each of the other rotors remaining in operation may be increased in order to compensate for this loss of lift from at least one rotor, which can contribute to increasing the mechanical stresses that might appear on the multirotor aircraft, and in particular on its longitudinal structure. The rigid central framework provides the multirotor aircraft with sufficient mechanical strength to withstand these additional mechanical stresses.

The fuselage of the multirotor aircraft of the invention serves to transport one or more passengers and/or goods. The fuselage is fastened to the longitudinal structure, e.g. by means of links. The fuselage can thus easily be replaced should that be necessary, e.g. in order to change from transporting passengers only to transporting goods.

The fuselage may also include landing gear e.g. landing gear with wheels or landing gear with skids.

Furthermore, the rotors are arranged in such a manner that two adjacent rotors are contra rotating. As a result, the rotor(s) nearest to another rotor rotate(s) in a direction of rotation opposite to the direction of rotation of that other rotor. Consequently, the inertial effects resulting from the respective rotations of those rotors compensate mutually without any need to make use of an antitorque device as is conventionally used on helicopters.

The set of rotary lift surfaces advantageously comprises at least six rotors. Using a large number of rotors makes it possible to limit the installed power needed to drive rotation of each rotor, and thus makes it possible to use motors of low power and consequently of all dimensions, regardless of whether the motors are electric motors or combustion engines. In particular, such electric motors may operate advantageously while being cooled with air only, thereby avoiding the presence of an installation including liquid coolant, which would be complicated, heavy, and expensive. Using air-cool electric motors also makes it possible to improve the reliability and the availability of the multirotor aircraft in comparison with an aircraft having electric motors and an installation including liquid coolant.

Furthermore, using a large number of rotors advantageously makes it possible for the loss of lift from one or even two rotors to be compensated by the other rotors that remain in operation, whereby such a loss of lift has no significant effect on the ability of the aircraft to fly. By way of example, lift may be lost from a rotor as a result of a failure of the motor driving the rotor, or indeed as a result of a blade of the rotor breaking.

For example, the set of rotary lift surfaces comprises six rotors or eight rotors.

Each rotor has an axis of rotation that is substantially vertical and preferably comprises blades of pitch that is fixed, with the lift generated by each rotor being varied by modifying the speed of rotation of the rotor. By way of example, each rotor may have three blades. The rotors are preferably all of the same dimensions. Nevertheless, the rotors may be of different dimensions in order to optimize specifically the size of the multirotor aircraft of the invention.

The rotors are mounted on respective supports that are fastened to one or the other of the fixed wings. As a result, a plurality of rotors are connected to each of the fixed wings. Each rotor is preferably arranged at the end of a support that is fastened to a fixed wing.

Each rotor in the set of rotary lift surfaces may also include a respective duct in order to limit the creation of an aerodynamic drag force by the rotor during forward flight. Such ducts also make it possible for rotation of the blades of the rotors to be stopped during forward flight without that generating vibratory or aerodynamic disturbances.

Such ducts also serve to protect the blades against projected objects or bird strikes, for example.

Such a duct may also include a plurality of cavities or other shapes for forming acoustic energy absorber systems so as to limit the propagation of noise that is uncomfortable for the human ear. By way of example, such cavities or other shapes may form Helmholtz resonators serving in particular to dissipate a resonance phenomenon that might be caused by the stream of air generated by the rotation of the blades of the rotors, and thereby avoid the propagation of sound vibrations that are disagreeable for the human ear.

By way of example a duct may be connected to the support on which the rotor is fastened by means of one or more connection arms. Furthermore, the duct of each rotor may also advantageously generate lift during the cruising stage in addition to the lift generated by the set of fixed lift surfaces.

The rotors of the set of rotary lift surfaces are preferably aligned along two longitudinal lines so as to limit the aerodynamic drag generated by these rotors during the cruising stage. Advantageously, the supports on which the rotors forming a longitudinal line are fastened are themselves also in longitudinal alignment in order likewise to limit the drag generated by these supports.

The ducts of the rotors forming a longitudinal line may be merged together in part in order to form a common fairing.

Furthermore, along each longitudinal line of rotors, the direction of rotation of a rotor is reversed between two consecutive rotors so that any two adjacent rotors in a longitudinal line are contra rotating.

Furthermore, the two fixed wings that are arranged at respective ends of the longitudinal structure may have the same dimensions. Nevertheless, it is also possible for the two fixed wings to be of different dimensions, for example the front fixed wing may be of smaller dimensions than the rear fixed wing. As a result, the front fixed wing serves essentially to stabilize the aircraft during the cruising stage, while the rear fixed wing provides a major part of the lift of the aircraft during the cruising stage.

At least one fixed wing may include movable flaps installed at the trailing edge of the fixed wing transversely on either side of the longitudinal structure. These movable flaps are under pilot control so as to enable the multirotor aircraft to perform movements about its pitching and roll axes. Preferably, a fixed wing has four movable flaps, with pairs of movable flaps being arranged transversely on either side of the longitudinal structure in order to mitigate a failure, such as jamming, of one of the movable flaps, and thereby enable the multirotor aircraft to be controlled in complete safety.

Preferably, both of the fixed wings include movable flaps arranged at their trailing edges.

The failure of a flap can also be compensated by appropriate differential use of the lift from the rotors, e.g. under the control of the autopilot system of the aircraft.

As a result, the multirotor aircraft of the invention advantageously presents redundancy concerning its flight control functions about its pitching and roll axes.

Furthermore, the propulsion assembly of the multirotor aircraft of the invention includes at least one propulsion propeller having its axis of rotation arranged substantially horizontally and longitudinally. This at least one propulsion propeller may for example be arranged above the fixed wing. Preferably, at least one propulsion propeller is fastened above the rear fixed wing by means of a pylon. The axis of rotation of each propulsion propeller is advantageously offset relative to the first plane P1 of the fixed wings and relative to the second plane P2 of the rotors so that each of the propulsion propellers has a relatively undisturbed stream of air passing therethrough.

By way of example, each propulsion propeller has three blades that are collectively variable in pitch. As a result, the propulsion force generated by each propeller can be modulated both by varying the speed of rotation of the propulsion propeller and also by varying the collective pitch of its blades.

The propulsion assembly may comprise two propulsion propellers fastened to the longitudinal structure in order to provide the aircraft with better mechanical strength. By way of example, each propulsion propeller may be in alignment with one of the longitudinal beams of the longitudinal structure. Differential thrust from the two propellers can advantageously be used to perform yaw movement during forward flight.

As a result, the multirotor aircraft of the invention advantageously presents redundancy concerning its propulsion functions.

At least one fixed wing may also include at least one vertical fin in order to provide stability about the yaw axis of the multirotor aircraft of the invention. This at least one vertical fin may also include at least one movable flap for controlling yaw movement of the multirotor aircraft. In a multirotor aircraft having at least two propulsion propellers, this vertical fin including at least one movable flap also serves to mitigate a failure of one of the propulsion propellers in terms of controlling the multirotor aircraft about its yaw axis.

As a result, the multirotor aircraft of the invention advantageously presents redundancy concerning its flight control functions about its yaw axis.

By way of example, each vertical fin is arranged at a free end of a fixed wing, preferably of the rear fixed wing, and by way of example it may extend downwards in order to limit aerodynamic coupling between roll and yaw. A fixed wing may have two vertical fins arranged respectively at each of its free ends.

A vertical fin may also be formed by a pylon supporting a propulsion propeller.

The power plant comprises a plurality of electric motors and at least one electrical energy source. Each electric motor drives a respective rotor or a respective propulsion propeller. Each electric motor is preferably air-cooled.

An electrical energy source comprises one or more electrical energy storage devices. By way of example, an electrical energy storage device may be a rechargeable battery or indeed a fuel cell. Electrical energy source may then include an electrical energy management device serving in particular to control the discharging of the electrical energy storage devices.

An electrical energy source may also include an electricity generator and a combustion engine for driving the electricity generator so as to generate electrical energy. As a result, the power plant of the multirotor aircraft of the invention is said to be "hybrid". The electrical energy generated by the electricity generator can then be used directly for powering the electric motors or else for electrically recharging each electrical energy storage device. The electrical energy source may then include an electrical energy management device serving in particular to control the charging and the discharging of the electrical energy storage devices.

Also, the power plant may include at least two sources of electrical energy that are distinct and independent for powering each electric motor. These at least two electrical energy sources are then preferably separated and isolated from each other so that in the event of an incident occurring with one of the electrical energy sources, such as thermal runaway or degassing, that incident does not propagate to the other electrical energy source. By way of example, these at least two electrical energy sources are separated by a separation wall, or indeed they are arranged in respective dedicated confinement boxes.

Each electrical energy source may be located in a dedicated compartment of the fuselage of the multirotor aircraft, e.g. at the rear of the fuselage, or else in the longitudinal structure.

The autopilot system is provided with sensors that enable the rotors, each propulsion propeller, and also the movable flaps to be controlled in autonomous manner so as to control the multirotor aircraft of the invention. Nevertheless, the multirotor aircraft of the invention may include control means so as to enable an occupant of the multirotor aircraft to pilot the multirotor aircraft directly.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that appear in more than one of the figures are given the same references in each of them.

Figure 1:
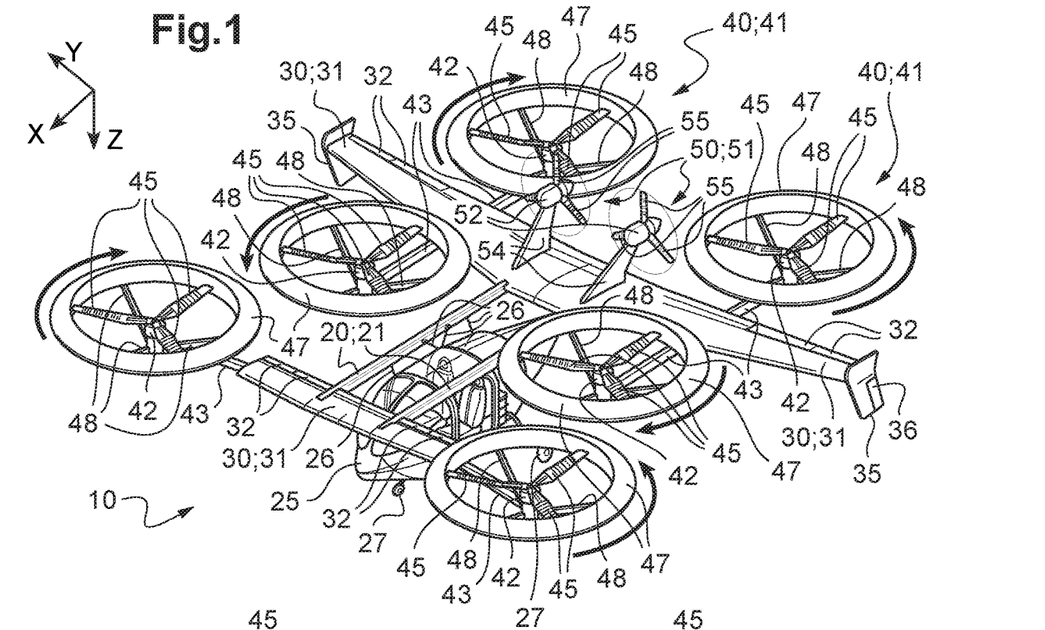
FIGS. 1 to 5 show a first embodiment of a multirotor aircraft.
Figure 2:
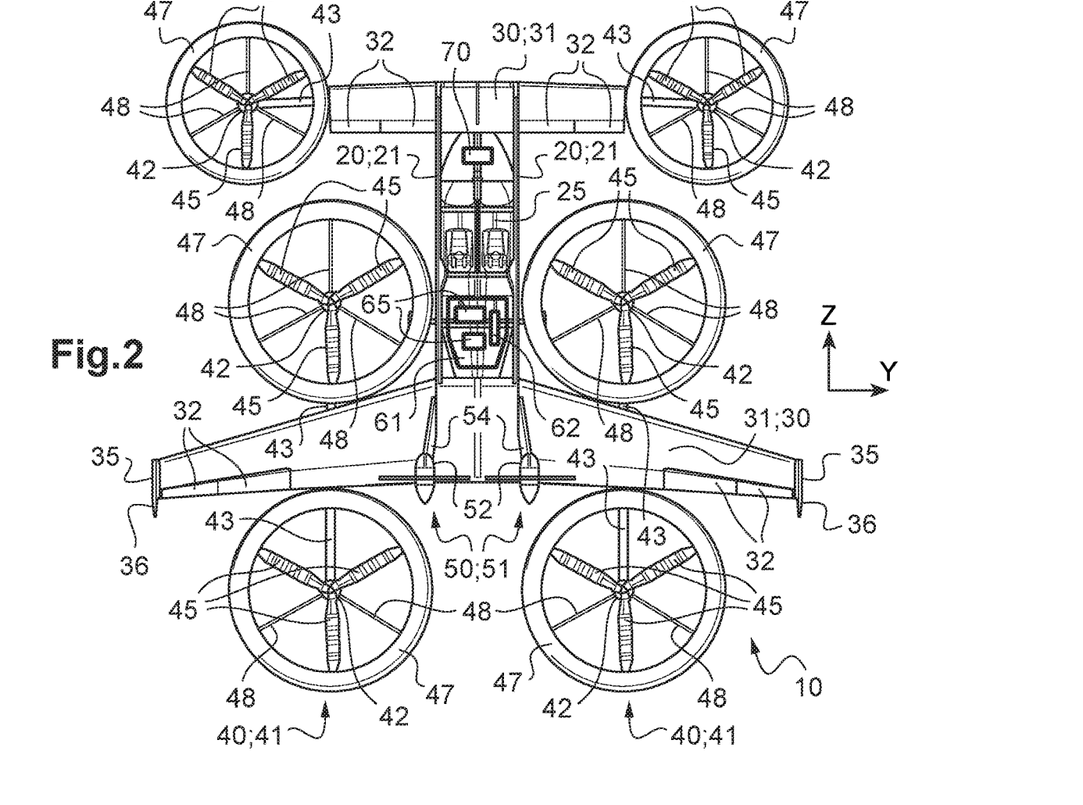
Figure 3:
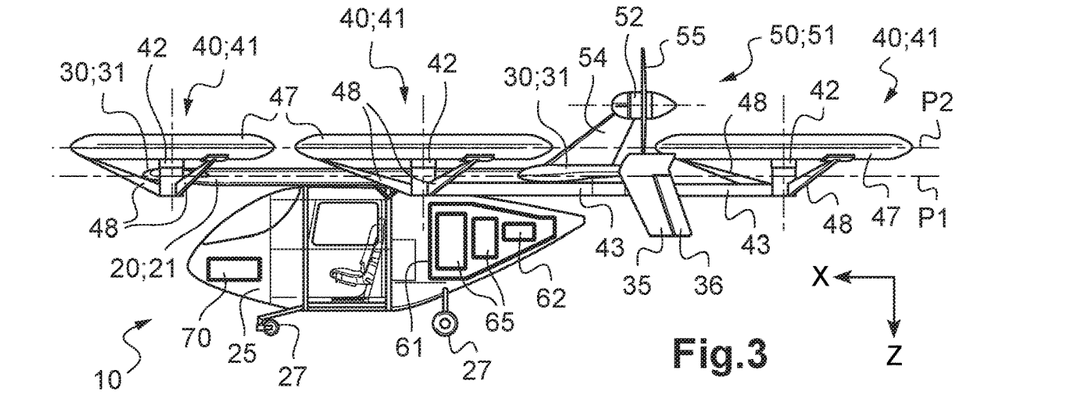

A first embodiment of a multirotor aircraft 10 of the invention has three variants. A first variant is shown in FIGS. 1 to 3, in a perspective view in FIG. 1, in a plan view in FIG. 2, and in a side view in FIG. 3.

Figure 4:
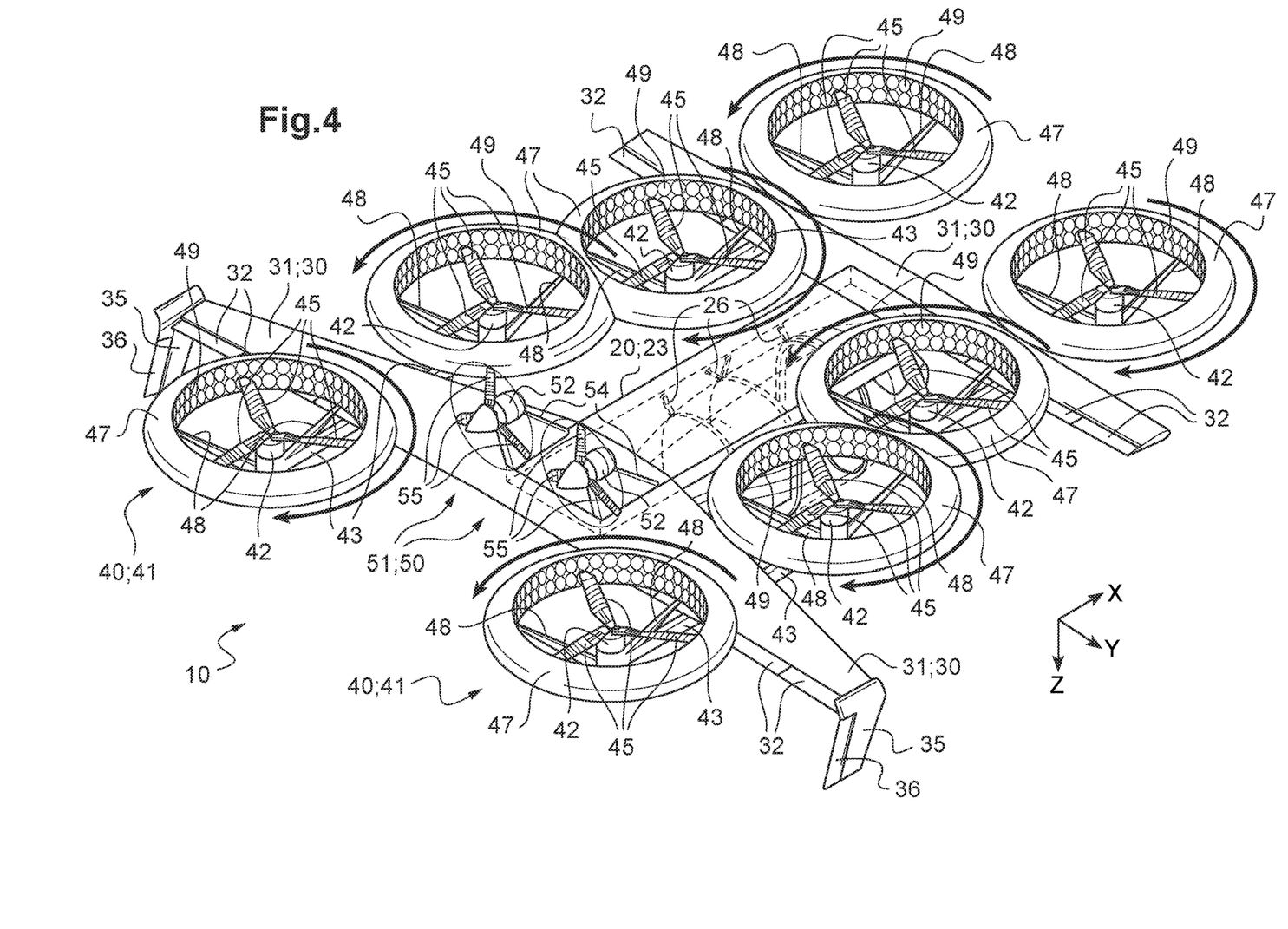
Figure 5:
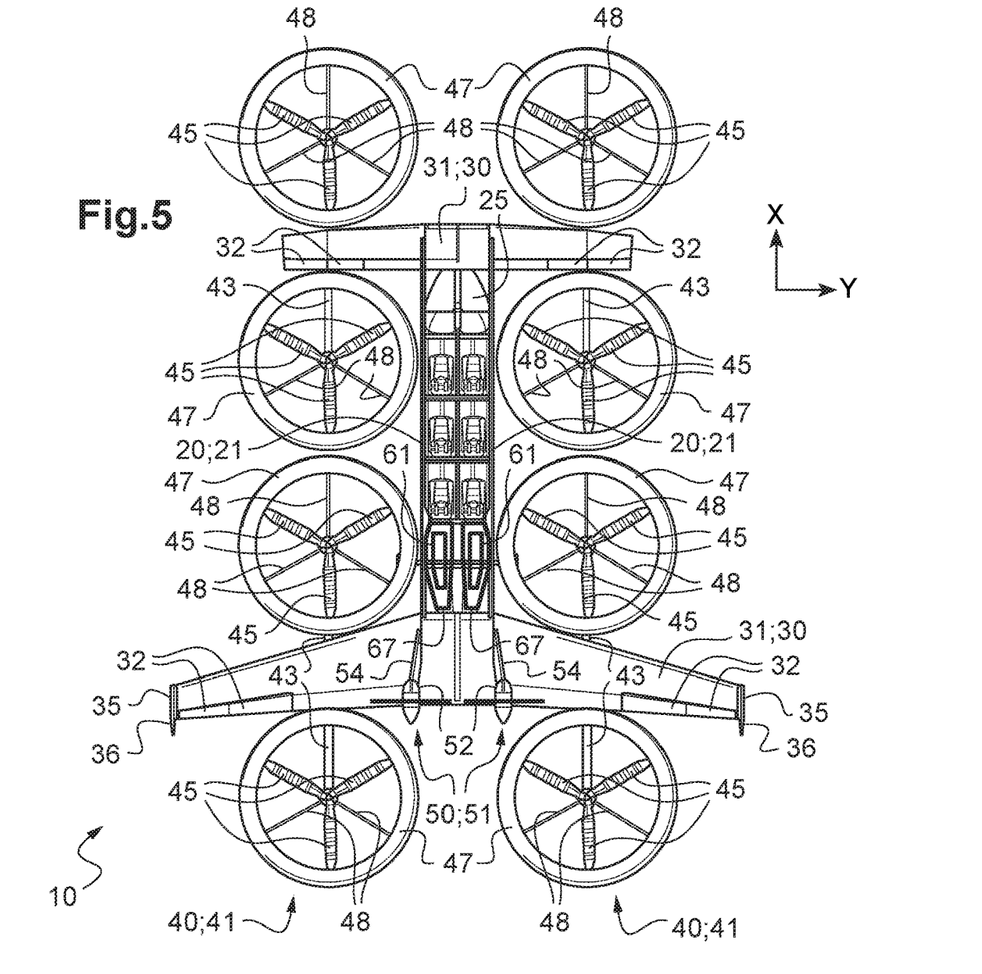

A second variant is shown in FIG. 4 in a perspective view, and a third variant is shown in FIG. 5 in a plan view.

Figure 6:
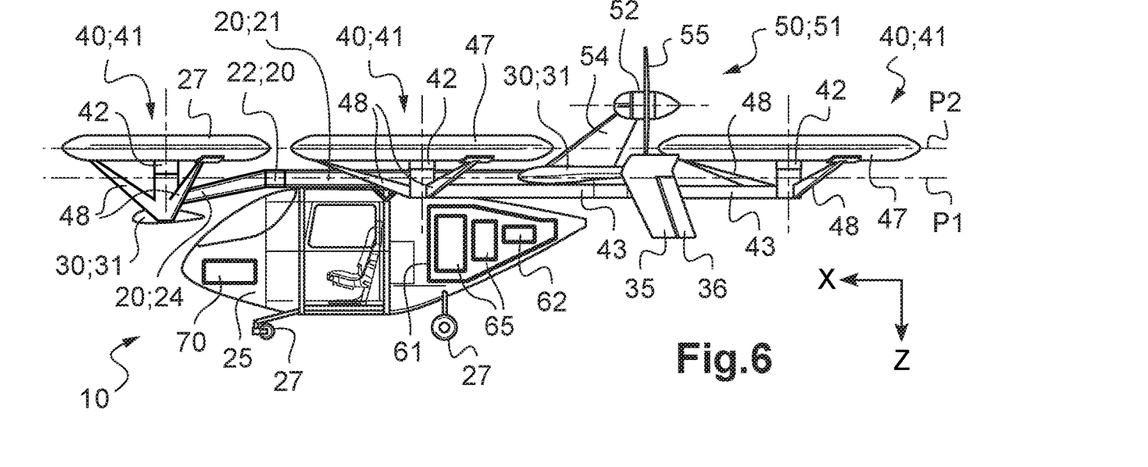
FIGS. 6 and 7 show a second embodiment of a multirotor aircraft.
Figure 7:
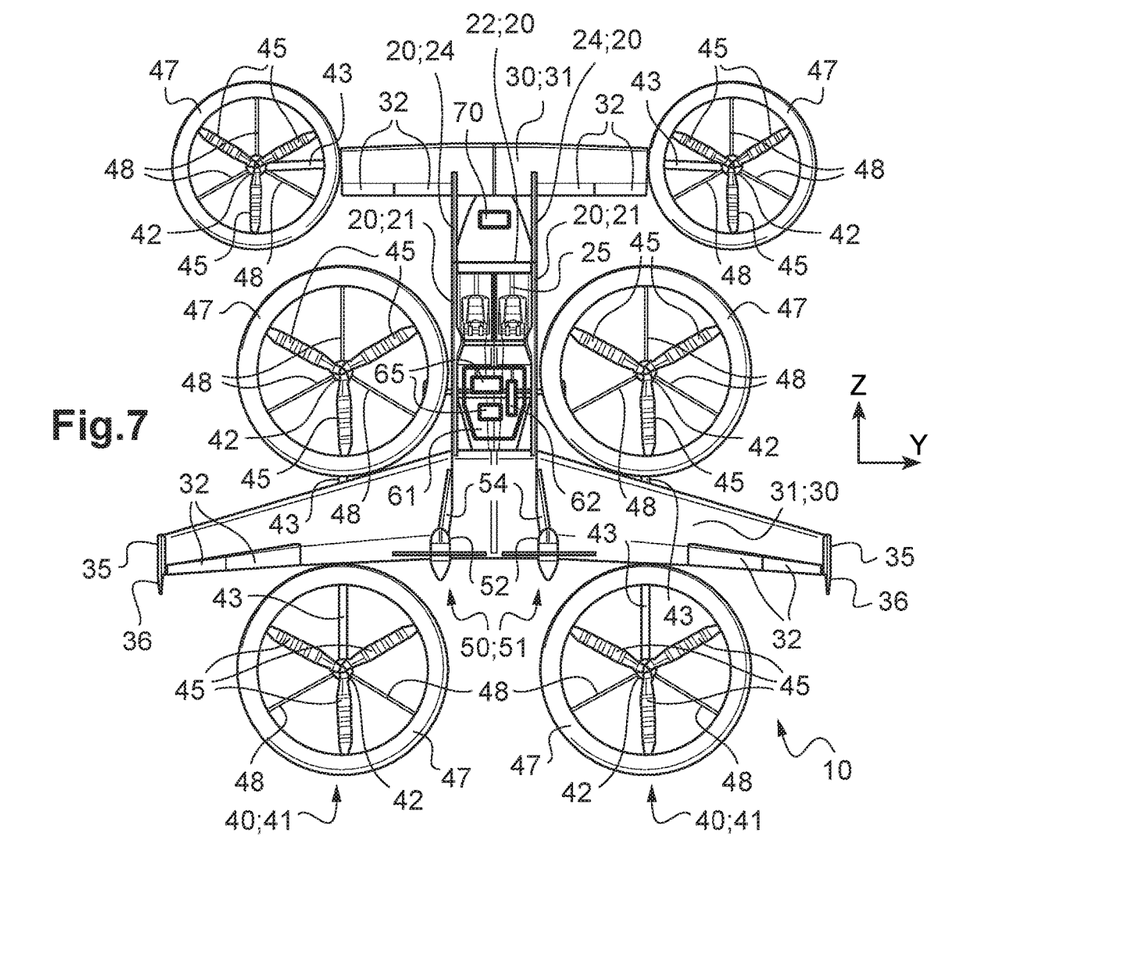

A second embodiment of a multirotor aircraft 10 of the invention is shown in a side view in FIG. 6 and in a plan view in FIG. 7.

These figures show an (X, Y, Z) reference frame. The longitudinal direction X extends from the rear of the aircraft 10 towards the front of the aircraft 10. The elevation direction Z extends downwards perpendicularly to the longitudinal direction X, and the transverse direction Y extends from left to right perpendicularly to the longitudinal and elevation directions X and Z.

As a result, the longitudinal direction X is the roll axis of the aircraft 10, the transverse direction Y is its pitching axis, and the elevation direction Z is its yaw axis.

In a manner that is common to both of these embodiments, a multirotor aircraft 10 comprises:

a longitudinal structure 20 extending essentially parallel to the longitudinal direction X;

a fuselage 25 fastened to the longitudinal structure 20 by means of links 26;

a set of fixed lift surfaces 30 having two fixed wings 31 rigidly connected to respective longitudinal ends of the longitudinal structure 20;

a set of rotary lift surfaces 40 having at least six rotors 41 arranged on respective supports 43 fastened to a fixed wing 31;

a propulsion assembly 50 comprising two propulsion propellers 51;

a power plant comprising a plurality of electric motors 42, 52 and at least one electrical energy source 61:

each electric motor 42, 52 driving a respective rotor 41 or else a respective propulsion propeller 51; and at least one electrical energy source 61 comprising a plurality of electrical energy storage devices 65; and an autopilot system 70 for the aircraft 10.

The fuselage 25 serves to transport one or more passengers and/or goods. The fuselage 25 is fastened to the longitudinal structure 20 by means of links 26. The fuselage includes landing gear 27.

In the first embodiment of the multirotor aircraft 10, the longitudinal structure 20 is plane and extends along a first plane P1 parallel to the longitudinal and transverse directions X and Y. The two fixed wings 31 are fastened so as to extend the longitudinal structure 20 and they lie substantially in the first plane P1.

In the first and third variants of this first embodiment of the multirotor aircraft 10, the longitudinal structure 20 has two straight longitudinal beams 21 extending in the first plane P1, with the fixed wings 31 being rigidly fastened to their ends.

In the second variant of this first embodiment of the multirotor aircraft 10, the longitudinal structure 20 comprises a rigid and flat single-piece box 23 extending in the first plane P1. The two fixed wings 31 are fastened directly to the rigid box 23.

As a result, in this first embodiment, and regardless of the variant, a rigid central framework is formed by the longitudinal structure 20 and the two fixed wings 31. Depending on the variant, this rigid central framework is formed either by the longitudinal beams 21 and the two fixed wings 31, or else by the rigid box 23 and the two fixed wings 31.

A front fixed wing 31, situated longitudinally at the front of the longitudinal structure 20, is of smaller dimensions than a rear fixed wing 31 situated longitudinally at the rear of the longitudinal structure 20. During a stage of cruising flight, the rear fixed wing 31 thus provides a major part of the lift of the aircraft 10, while the front fixed wing 31 serves essentially to stabilize the multirotor aircraft 10.

Nevertheless, both of the fixed wings 31 could have the same dimensions.

Each of the two fixed wings 31 has four movable flaps 32 installed at its trailing edge, pairs of movable flaps 32 being arranged transversely on either side of the longitudinal structure 20. These movable flaps 32 are under pilot control so as to enable the multirotor aircraft 10 to perform movements about its pitching and roll axes.

The rear fixed wing 31 also has two vertical fins 35 arranged at respective free ends of the rear fixed wing 31 and extending downwards for the purpose of providing stability about the yaw axis of the multirotor aircraft 10. Each vertical fin 35 has a movable flap 36 providing pilot control over yaw movement of the multirotor aircraft 10.

The rotors 41 of the set of rotary lift surfaces 40 are arranged in a common second plane P2 distinct from the first plane P1 and parallel to the first plane P1, as shown in FIGS. 3 and 6. Furthermore, the two fixed wings 31 are vertically offset relative to the rotors 41 and to the second plane P2.

Each rotor 41 has an axis of rotation that is substantially vertical and includes three fixed-pitch blades 45. The second plane P2 is formed by the points where the respective axes of rotation of the rotors 41 intersect a mean plane formed by their blades 45. Each rotor 41 is driven in rotation by a respective electric motor 42 that is air-cooled. It should be observed that the number of blades is not limiting.

The rotors 41 are arranged in such a manner as to be offset vertically relative to the fixed wings 31, specifically neither of the two fixed wings 31 lies in the second plane P2 as formed by the rotors 41.

The rotors 41 are also arranged in such a manner as to be offset horizontally relative to the two fixed wings 31, i.e. none of the rotors 41 is located vertically above or below a fixed wing 31.

In the second variant of this first embodiment, the set of rotary lift surfaces 40 comprises six rotors 41. Two rotors 41 are fastened via respective supports 43 to the front fixed wing 31, and four rotors 41 are fastened via respective supports 43 to the rear fixed wing 31.

In the second and third variants of this first embodiment of the aircraft 10, the set of rotary lift surfaces 40 comprises eight rotors 41. Four rotors 41 are fastened via respective supports 43 to the front fixed wing 31, and four rotors 41 are fastened via respective supports 43 to the rear fixed wing 31.

In the second embodiment of the multirotor aircraft 10, the longitudinal structure 20 comprises two longitudinal beams 21, two connection beams 24, and one transverse beam 22. Each connection beam 24 is rigidly fastened to a front end of a respective longitudinal beam 21. The transverse beam 22 is rigidly fastened to the two longitudinal beams 21 and connects them together at their front ends.

The rear fixed wing 31 is rigidly fastened to the longitudinal structure 20 in the first plane P1, while the front fixed wing 31 is rigidly fastened to the two connection beams 24 and is offset vertically downwards relative to the rear fixed wing 31 and to the first plane P1.

As a result, in this second embodiment, a rigid central framework is likewise formed by the longitudinal structure 20 and the two fixed wings 31, and more precisely by the longitudinal beams 21, the connection beams 24, the transverse beam 22, and the two fixed wings 31.

Thus, whatever the embodiment of the multirotor aircraft 10, a rigid central framework provides the multirotor aircraft 10 with considerable mechanical strength, in particular enabling it to withstand the mechanical stresses to which it is subjected in flight and also the stresses that result from a loss of lift from at least one rotor 41.

The offset in the vertical plane between the rotors 41 and the fixed wings 31 enables the air stream sweeping over the rear fixed wing 31 in the first variant of the first embodiment, and over both fixed wings 31 in the second and third variants of the first embodiment and also in the second embodiment, to be disturbed little or not at all by the rotors 41 situated upstream from the rear fixed wing 31 and where applicable, from the front fixed wing 31 during forward flight, and in particular during a stage of cruising flight. As a result, the generation of lift by each of these fixed wings 31 is advantageously optimized.

Furthermore, the offset in the horizontal plane between the rotors 41 and the fixed wings 31 ensures that the air stream passing through each rotor 41 does not sweep over a fixed wing 31 and consequently and advantageously does not lead to the appearance of any negative lift on the fixed wings 31.

Each rotor 41 also has a duct 47 serving to limit the drag generated by the rotor 41 during forward flight of the multirotor aircraft 10, and in particular during cruising flight. The duct 47 is fastened to the support 43 via three connection arms 48.

In the second variant of the first embodiment of the multirotor aircraft 10, the duct 47 of each rotor 40 includes a plurality of cavities, as can be seen in FIG. 4, these cavities constituting an acoustic energy absorber system 49 for limiting the propagation of noise that is uncomfortable for the human ear from each of the rotors 40.

In the first variant of the first embodiment as shown in FIGS. 1 to 3, and in the second embodiment as shown in FIGS. 6 and 7, the two rotors 41 fastened to the front fixed wing 31 have smaller diametral dimensions than the rotors 41 fastened to the rear fixed wing 31, in order to optimize the overall size of the multirotor aircraft 10.

In the second and third variants of the first embodiment of the aircraft 10, all eight rotors 41 of the set of rotary lift surfaces 40 have the same dimensions. Nevertheless, in the second variant shown in FIG. 4, the rotors 41 fastened to the front fixed wing 31 and the rotors 41 fastened to the rear fixed wing 31 are offset transversely in order to limit the longitudinal sides of the multirotor aircraft 10.

In contrast, in the third variant shown in FIG. 5, the rotors 41 are aligned along two longitudinal lines so as to limit the aerodynamic drag generated by the rotors 41 during forward flight. Consequently, the longitudinal size of the multirotor aircraft 10 in the third variant is greater than the longitudinal size of the aircraft 10 in the second variant, however the aerodynamic performance of the third variant is improved compared with the performance of the second variant.

Furthermore, the rotors 41 are arranged in such a manner that two longitudinally adjacent rotors 41 are contra rotating so as to limit the inertial effects that result from the respective rotations of these rotors 41.

Whatever the embodiment of the multirotor aircraft 10, the two propulsion propellers 51 of the propulsion assembly 50 of the multirotor aircraft 10 have respective axes of rotation that are substantially horizontal and substantially longitudinal. The two propulsion propellers 51 are fastened to the longitudinal structure 20 and they are arranged above the rear fixed wing 31, with the axis of rotation of each propulsion propeller 51 being situated in a plane that is different from the first plane P1 and from the second plane P2. Each propulsion propeller 51 is fastened to the longitudinal structure 20 via a pylon 54 and is in alignment with a longitudinal beam 21.

Each propulsion propeller 51 has three blades 55 of pitch that is variable collectively and it is driven in rotation by a respective electric motor 52 that is air-cooled. It should be observed that the number of blades is not limiting.

The power plant of the multirotor aircraft 10 comprises the electric motors 42, 52 respectively driving the rotors 41 and the propulsion propellers 51, together with one or more electrical energy sources arranged at the rear of the fuselage 25.

In the first variant of the first embodiment and in the second embodiment, the power plant of the multirotor aircraft 10 comprises an electrical energy source 61 provided with two electrical energy storage devices 65 and an electrical energy management device 62, as shown in FIGS. 2 and 3. The management device 62 controls in particular the discharging of the two electrical energy storage devices 65. The power plant of the multirotor aircraft 10 in this first embodiment is purely electrical.

Figure 8:
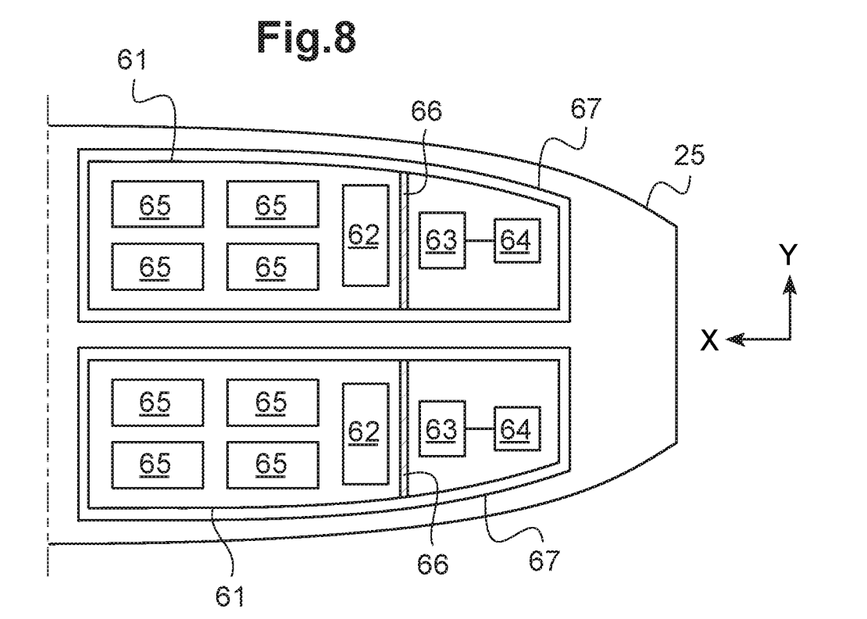
FIG. 8 is a detailed view of a portion of the fuselage of the aircraft and of its electrical energy sources.

In the third variant of the first embodiment, the power plant of the multirotor aircraft 10 has two distinct and independent electrical energy sources, as shown in FIGS. 5 and 8. Both electrical energy sources 61 power each of the electric motors 42, 52, and in addition they are separated and isolated from each other so that an incident involving one of the two electrical energy sources 61 does not propagate to the other electrical energy source 61. For this purpose, the two electrical energy sources 61 are arranged in respective dedicated confinement boxes 67.

Each electrical energy source 61 comprises four rechargeable electrical energy storage devices 65, an electrical energy management device 62, and also a combustion engine 63 and an electricity generator 64 driven by the engine 63 so as to generate electrical energy. A firewall 66 is arranged between the rechargeable electrical energy storage devices 65 together with the management device 62, and the engine 63 together with the electricity generator 64 so as to provide isolation in the event of a fire, e.g. in the vicinity of the engine 63. The power plant of the multirotor aircraft 10 in this embodiment is said to be "hybrid". The management device 62 then controls both the charging and the discharging of the electrical energy storage devices 65.

The autopilot system 70, e.g. arranged in a zone at the front of the fuselage 25 of the multirotor aircraft 10 is provided with sensors (not shown) and serves the control the rotors 41, the propulsion propellers 51, and the movable flaps 32, 36 in autonomous manner so as to pilot the multirotor aircraft 10.

A flight of the multirotor aircraft 10 comprises a take off stage, a landing stage, and a cruising stage.

During the takeoff and landing stages, the lift needed by the multirotor aircraft 10 is generated for the most part by the set of rotary lift surfaces 40, i.e. the rotors 41.

During the cruising stage, the lift needed by the multirotor aircraft 10 is generated for the most part by the set of fixed lift surfaces 30, i.e. the two fixed wings 31.

During a stage of transition between a takeoff or landing stage and a cruising stage, the set of fixed lift surfaces 30 and the set of rotary lift surfaces 40 act together to generate the lift needed by the multirotor aircraft 10.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A multirotor aircraft comprising:
    a longitudinal structure having two longitudinal ends;
    a fuselage fastened to the longitudinal structure by links;
    a set of fixed lift surfaces having two fixed wings generating the majority of the lift needed by the aircraft during a cruising stage;
    a set of rotary lift surfaces having at least six rotors generating the majority of the lift needed by the aircraft during stages of takeoff and landing, the rotors being arranged on respective supports fastened to a fixed wing, each rotor being fastened in such a manner that each rotor is not situated vertically above or below a fixed wing;
    a propulsion assembly comprising at least one propulsion propeller;
    a power plant comprising a plurality of electric motors and at least one electrical energy source:
        each electric motor driving a respective rotor or else a respective propulsion propeller; and
        at least one electrical energy source comprising one or more electrical energy storage devices; and
    an autopilot system for the aircraft;

one of the two fixed wings being rigidly fastened to a front longitudinal end of the longitudinal structure, the longitudinal structure extends mainly in a first plane, wherein the other one of the two fixed wings is rigidly fastened to a rear longitudinal end of the longitudinal structure, and wherein the rotors are arranged in a common second plane distinct from the first plane.

2. An aircraft, according to claim 1, wherein the longitudinal structure is spaced apart from the fuselage, the longitudinal structure comprising two longitudinal beams extending in the first plane, at least one fixed wing being fastened to the longitudinal beams.

3. An aircraft, according to claim 1, wherein the longitudinal structure is spaced apart from the fuselage, the longitudinal structure comprising a rigid box extending in the first plane, at least one fixed wing being fastened to the rigid box.

4. An aircraft, according to claim 1, wherein the longitudinal structure is spaced apart from the fuselage and includes two connection beams that slope relative to the first plane, and one of the two fixed wings is fastened to first ends of the connection beams and is offset vertically relative to the first plane.

5. An aircraft, according to claim 4, wherein, when the longitudinal structure comprises two longitudinal beams, a respective connection beam is rigidly fastened to each longitudinal beam, and the longitudinal structure includes a transverse beam connecting together the two longitudinal beams.

6. An aircraft, according to claim 4, wherein, when the longitudinal structure comprises two longitudinal beams, one of the two longitudinal beams and one of the two connection beams together constitute a single part.

7. An aircraft, according to claim 1, wherein at least one fixed wing includes four movable flaps, with pairs of movable flaps being arranged transversely on either side of the longitudinal structure.

8. An aircraft, according to claim 1, wherein at least one fixed wing includes two vertical fins, each provided with at least one movable flap, the vertical fins being arranged at respective free ends of the fixed wing.

9. An aircraft, according to claim 1, wherein the rotors are aligned along two longitudinal lines so as to limit the creation of aerodynamic drag.

10. An aircraft, according to claim 1, wherein the rotors include respective ducts, each duct being connected to a respective one of the supports by one or more connection arms.

11. An aircraft, according to claim 10, wherein the duct of each rotor includes a plurality of acoustic energy absorber systems.

12. An aircraft, according to claim 1, wherein an axis of rotation of the at least one propulsion propeller is arranged above the fixed wing, and is offset from the first plane and the second plane.

13. An aircraft, according to claim 1, wherein the propulsion assembly comprises two propulsion propellers fastened to the longitudinal structure.

14. An aircraft, according to claim 1, wherein each electric motor of the power plant is air-cooled.

15. An aircraft, according to claim 1, wherein the power plant comprises at least two independent electrical energy sources powering each of the electric motors, the at least two electrical energy sources being separated and isolated from each other so that an incident occurring on one of the electrical energy sources does not propagate to the other electrical energy source.

16. An aircraft, according to claim 1, wherein the rotors are arranged so that two adjacent rotors are contra rotating.

17. An aircraft, according to claim 1, wherein the first plane is parallel to the second plane, and the first plane is fixed relative to the second plane.

18. An aircraft, according to claim 1, wherein each support extends outwardly from one of the fixed wings to a distal end with the associated rotor mounted thereto.

19. A multirotor aircraft comprising:
a longitudinal structure extending in a first plane and having a front longitudinal end and a rear longitudinal end;
a fuselage spaced apart from the longitudinal structure and fastened to the longitudinal structure via links;
first and second fixed wings providing fixed lift surfaces to generate a majority of the lift needed by the aircraft during a cruising stage, the first fixed wing rigidly fastened to the front longitudinal end of the longitudinal structure, and the second fixed wing rigidly fastened to the rear longitudinal end of the longitudinal structure;
six rotors providing rotary lift surfaces to generate a majority of the lift needed by the aircraft during stages of takeoff and landing, the six rotors arranged in a common second plane distinct from and fixed relative to the first plane, each rotor directly mounted to an associated support fastened to one of the first and second fixed wings, each rotor being fastened in such a manner that each rotor is offset laterally from the fixed wings and is not situated vertically above or below the fixed wings;
a propulsion assembly comprising at least one propulsion propeller;
a power plant comprising a plurality of electric motors and at least one electrical energy source:
each electric motor driving a respective rotor or else a respective propulsion propeller; and
at least one electrical energy source comprising one or more electrical energy storage devices; and
an autopilot system for the aircraft;
wherein the first and second fixed wings are vertically offset from the six rotors and the second plane.

20. An aircraft, according to claim 19, wherein each support extends outwardly from one of the fixed wings to a distal end with the associated rotor mounted thereto; and
wherein an axis of rotation of the at least one propulsion propeller is offset from the first plane and the second plane.

* * * * *